United States Patent
Fontaine et al.

(10) Patent No.: US 11,674,611 B2
(45) Date of Patent: Jun. 13, 2023

(54) WEAR-RESISTANT ELECTRO-PNEUMATIC CONVERTERS

(71) Applicant: Fisher Controls International LLC, Marshalltown, IA (US)

(72) Inventors: Mike Fontaine, Marshalltown, IA (US); Ronald F. Hurd, Marshalltown, IA (US); Curt Galbreath, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 96 days.

(21) Appl. No.: 17/237,809

(22) Filed: Apr. 22, 2021

(65) Prior Publication Data

US 2022/0341504 A1    Oct. 27, 2022

(51) Int. Cl.
*F16K 31/06* (2006.01)
*F16K 15/18* (2006.01)

(52) U.S. Cl.
CPC ...... *F16K 31/0651* (2013.01); *F16K 15/1826* (2021.08); *F16K 31/0658* (2013.01); *F16K 31/0668* (2013.01)

(58) Field of Classification Search
CPC ............. F16K 31/0651; F16K 31/0658; F16K 31/0668; F16K 15/1826
See application file for complete search history.

(56) References Cited

U.S. PATENT DOCUMENTS

| | | | | |
|---|---|---|---|---|
| 3,921,670 A | * | 11/1975 | Clippard, Jr. | F16K 31/0606 137/625.65 |
| 4,088,975 A | * | 5/1978 | Lang | F16K 31/0658 335/262 |
| 4,196,751 A | * | 4/1980 | Fischer | F16K 31/0627 137/625.65 |
| 4,344,603 A | | 8/1982 | Hozumi et al. | |
| 4,887,769 A | | 12/1989 | Okamoto et al. | |
| 4,986,246 A | * | 1/1991 | Kessler de Vivie | F16K 31/0651 251/129.21 |
| 5,158,263 A | * | 10/1992 | Shimizu | F16K 31/0655 251/129.21 |
| 5,374,029 A | * | 12/1994 | Bailey | F16K 31/0624 251/129.21 |
| 5,758,865 A | * | 6/1998 | Casey | F16K 31/0655 251/129.21 |

(Continued)

*Primary Examiner* — Umashankar Venkatesan
(74) *Attorney, Agent, or Firm* — Hanley, Flight & Zimmerman, LLC

(57) ABSTRACT

Wear-resistant electro-pneumatic converters are disclosed. An electro-pneumatic converter includes a body including an axial passageway extending between a first opening and a second opening, the first opening associated with a supply port, the supply port to receive pressurized fluid from a pressure supply source, a solenoid disposed within the axial passageway, an armature including a first side and a second side opposite the first side, the second side facing the solenoid, the armature movable between a first position and a second position, the pressurized fluid blocked from flowing through the output port when the armature is in the first position, the pressurized fluid to flow through the output port when the armature is in the second position, and a spring coupled to the first side of the armature, the spring to bias the armature toward the first position.

20 Claims, 6 Drawing Sheets

(56) References Cited

U.S. PATENT DOCUMENTS

| | | | | |
|---|---|---|---|---|
| 6,220,569 | B1* | 4/2001 | Kelly | F16K 31/06 |
| | | | | 251/129.08 |
| 7,748,683 | B1* | 7/2010 | Kelly | F16K 31/0655 |
| | | | | 251/129.08 |
| 10,422,438 | B2* | 9/2019 | Fontaine | F16K 31/0675 |
| 10,533,678 | B2* | 1/2020 | Levien | F16K 25/04 |
| 11,073,221 | B2* | 7/2021 | Fontaine | F16K 31/423 |
| 2011/0315907 | A1* | 12/2011 | Arns | F16K 31/0686 |
| | | | | 251/129.15 |
| 2020/0352454 | A1* | 11/2020 | Sano | A61B 5/02141 |

\* cited by examiner

WEAR-RESISTANT ELECTRO-PNEUMATIC CONVERTERS

FIELD OF THE DISCLOSURE

This disclosure relates generally to converters, and, more particularly, to electro-pneumatic converters.

BACKGROUND

Control valves (e.g., sliding stem valves, rotary valves, axial flow valves, globe valves, etc.) are commonly used in industrial processes, such as oil and gas pipeline distribution systems and chemical processing plants, to control the flow of process fluids. These control valves are automated using a pressure-operated actuator that is controlled by a remote-operated field instrument. The field instrument communicates with a process control computer to command fluid flow changes within the valve to achieve a desired control strategy via pressure-operated actuators. Electro-pneumatic converters, such as current-to-pressure transducers, are commonly used in field instruments to provide a conversion of an electrical signal to volumetric flow or pressure output to control the actuator and, thus, the control valve.

SUMMARY

An example electro-pneumatic converter includes a body including an axial passageway extending between a first opening and a second opening, the first opening associated with a supply port, the supply port to receive pressurized fluid from a pressure supply source. The example electro-pneumatic converter also includes a solenoid disposed within the axial passageway, an armature including a first side and a second side opposite the first side, the second side facing the solenoid, the armature movable between a first position and a second position, the pressurized fluid blocked from flowing through an output port of the electro-pneumatic converter when the armature is in the first position, the pressurized fluid to flow through the output port when the armature is in the second position, and a spring coupled to the first side of the armature, the spring to bias the armature toward the first position.

An example apparatus includes a cap including a supply channel and an output channel, the supply channel to receive fluid from a supply source, a sleeve coupled to the cap, the cap and sleeve defining an axial passageway, a solenoid positioned in the sleeve, the solenoid spaced apart from the cap to define a chamber therebetween, the output channel in fluid communication with the supply channel via the chamber, an armature positioned in the chamber between the solenoid and the cap, and a spring positioned in the chamber between the armature and the cap, at least one of the spring or the armature to block the fluid from flowing through the output channel when the solenoid is not activated, the fluid to flow through the output channel in response to an activation of the solenoid.

An example apparatus includes a supply port to receive pressurized fluid, an output port, an armature to move between a first position and a second position, the output port to be in fluid communication with the supply port when the armature is in the first position, the pressurized fluid blocked from accessing the output port when the armature is in the second position, means for biasing the blocking means toward the second position, the biasing means positioned between the armature and the supply port, and means for causing movement of the armature toward the first position.

Figure 1:
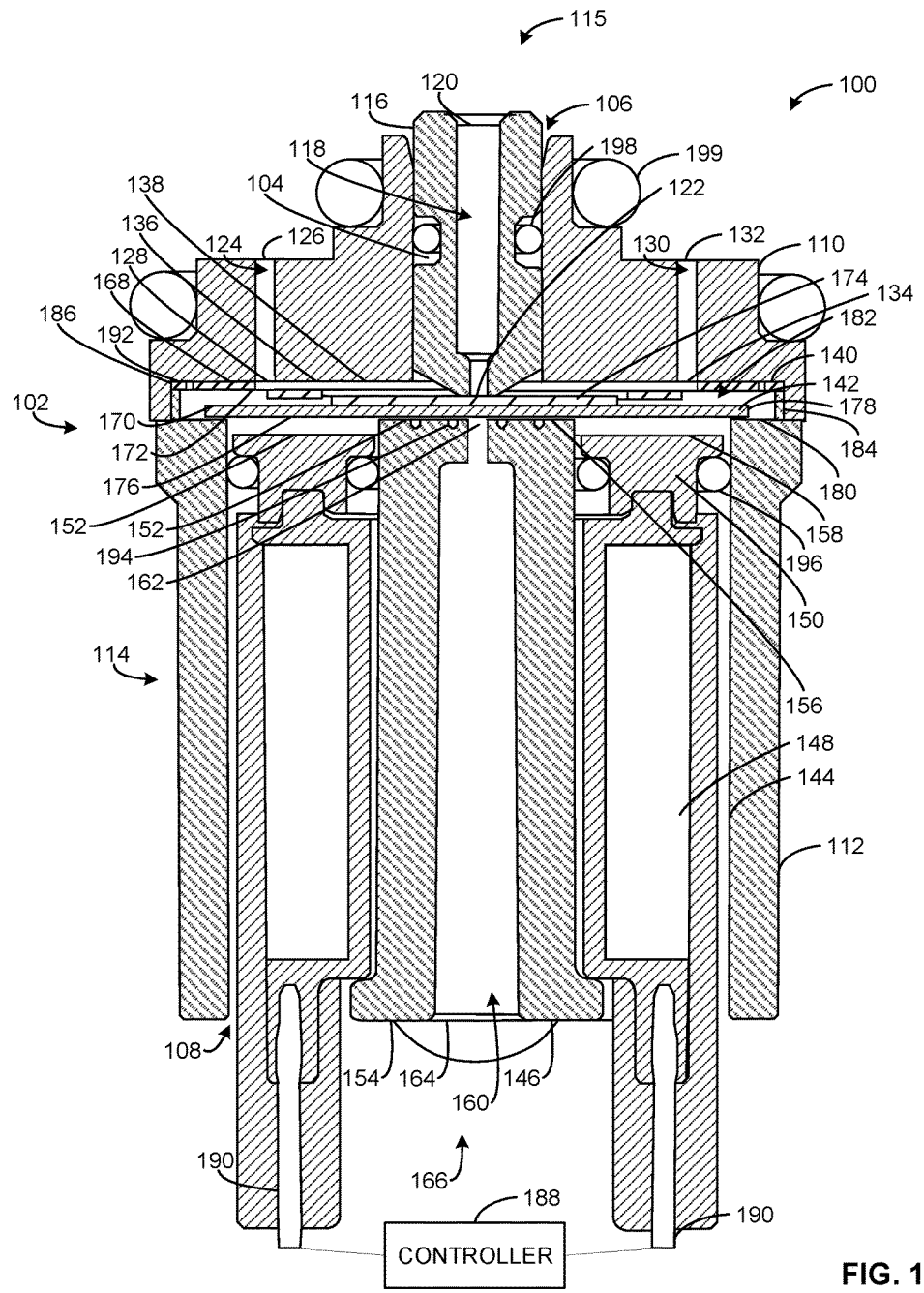
FIG. 1 illustrates a cross-sectional view of an example electro-pneumatic converter.

The figures are not necessarily to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein in the context of describing the position and/or orientation of a first object relative to a second object, the term "substantially parallel" encompasses the term parallel and more broadly encompasses a meaning whereby the first object is positioned and/or oriented relative to the second object at an absolute angle of no more than ten degrees (10°) from parallel. For example, a first axis that is substantially parallel to a second axis is positioned and/or oriented relative to the second axis at an absolute angle of no more than ten degrees (10°) from parallel.

DETAILED DESCRIPTION

Electro-pneumatic converters (also referred to as electro-pneumatic transducers or latching pneumatic transducers)

are used to convert an electrical input signal into a pneumatic pressure signal. In some examples, the electrical input signal is relatively small, such as on the order of milliamperes. Electro-pneumatic converters are often used in field instruments to provide a conversion of an electrical signal to a volumetric flow or pressure to control a process control device. In some instances, the output pressure or flow is amplified (e.g., via a relay) and used to operate a process control device, such as an actuator, to change a position or state of a valve.

Known electro-pneumatic converters typically utilize a complex system of pressure cavities, beams, and nozzles to convert an electrical signal into a pneumatic output signal. These systems are often large and require a relatively large amount of space to be implemented. Further, many known electro-pneumatic converters encounter wear from usage as a result of friction between moving components. In turn, many known electro-pneumatic converters consume or bleed air constantly during operation, which is expensive and wasteful to the environment.

Disclosed herein are example electro-pneumatic converters having geometries that are smaller, more durable, and which consume less power than known converters. In general, the example electro-pneumatic converters disclosed herein are to be fluidly coupled (e.g., in fluid communication) between a supply pressure source that supplies pressurized fluid and a downstream device, such as a pneumatic relay, that uses the pressurized fluid to control a process control device (e.g., an actuator). The example electro-pneumatic converters control the flow of the pressurized fluid between the supply pressure source and the downstream device. In particular, the example electro-pneumatic converters operate between a closed state (sometimes referred to as off or unlatched) and an open state (sometimes referred to as on or latched). In the closed state, no pressurized fluid is provided to the downstream device. In the open state, an electrical signal in the form of a current is applied to the electro-pneumatic converter, which allows the flow of pressurized fluid to the downstream device and, thus, converts an electrical input signal into a pneumatic pressure signal.

Example electro-pneumatic converters disclosed herein utilize a solenoid, an armature, and a spring to control the flow of pressurized fluid between a supply port and one or more output port(s). In some examples, the electro-pneumatic converter includes an axial passageway extending between the supply port (e.g., a first opening) and an exhaust port (e.g., a second opening). The one or more output port(s) are fluidly coupled to the axial passageway and may be coupled to a downstream device, such as a pneumatic relay. The supply port is to receive pressurized fluid from a pressure supply source.

In some examples, the armature includes a first side facing the supply port and a second side facing the solenoid. In some examples, the spring is disposed between the armature and the supply port. In such examples, the spring is coupled to the first side of the armature. In some examples, the armature is movable between a first position corresponding to the off or unlatched state and a second position corresponding to the on or latched state. When the armature is in the first position, the pressurized fluid is blocked from flowing through the one or more output port(s). Specifically, the supply port is blocked and the exhaust port is unblocked in the first position, which fluidly couples the output port(s) to the exhaust port allowing the output port(s) to be vented to the atmosphere. When the armature is in the second position, the pressurized fluid flows through the one or more output ports. Specifically, the armature blocks the exhaust port and the supply port is unblocked in the second position, which enables the pressurized fluid to flow from the supply port to the output port(s).

In some examples, the spring coupled to the armature biases the armature toward the first (closed) position. In some examples, the spring is a sheet including a first spiral cutout and a second spiral cutout, which are concentrically positioned within the sheet. In some examples, a ring spacer is positioned between an outer edge of the spring and the solenoid to maintain a position of the spring. In some examples, the spring includes an arm or tab extending away from a plane of the sheet and contacting the armature or the solenoid to maintain a position of the spring. In some examples, an outer edge of the spring is positioned between an outer edge of a first portion (e.g., an upper portion) and a second portion (e.g., a lower portion) of a body of the electro-pneumatic converter.

In some examples, the armature moves to the second (open) position in response to an activation of the solenoid. For example, a coil of the solenoid can produce a magnetic field in response to receiving current. Accordingly, the magnetic field of the coil can attract the armature (being made of metal) toward the solenoid, which moves the armature to the second position. In some examples, after the armature has been moved to the second position, the current applied to the coil of the solenoid is reduced and maintained until the solenoid is to be deactivated. For example, a higher current can be applied to the coil to produce a higher magnetic field, which attracts the armature toward the coil. Once the armature is closer to the coil in the second position, the coil can maintain the position of the armature with a reduced magnetic field. As such, a lower current can be applied to the coil to produce the reduced magnetic field. As a result, less power is used by the example electro-pneumatic converter to produce the same output pressure. Thus, the example electro-pneumatic converters disclosed herein have reduced power consumption relative to many known converters.

In some examples, the example electro-pneumatic converters disclosed herein minimize or otherwise reduce an amount of friction and/or wear encountered by the armature and/or associated components surrounding the armature. Specifically, the first side of the armature is welded (e.g., laser welded, spot welded, etc.) to the spring, which prevents the first side of the armature from encountering friction and, thus, wear. As such, the armature and the spring can be separately manufactured, which enables increased flexibility in the design of the armature and/or the spring. In addition, the separate manufacturing of the armature and the spring can simplify the manufacturing process, which, in turn, can reduce the cost associated therewith.

In some examples, the second side of the armature and an end of the solenoid that faces the armature both include a flatness of less than 10 micrometers (μm), which minimizes or otherwise reduces an amount of friction and/or wear that the armature encounters when the armature contacts the solenoid in the open position. In some examples, the flatness of the second side of the armature and the end of the solenoid enables the armature to seal the exhaust port without an elastomeric material. Specifically, in some examples, no elastomeric material is used to seal off the armature and/or the ports of the converter because of the difference in thermal expansion between the metal of the armature and elastomers that can occur for the widely different operating temperatures (e.g., between −60° C. and 85° C.) at which the converter may be put to use. Further, a side wall of the armature, which connects the first and second sides of the armature along the outer edge and/or perimeter of the armature, does not contact another surface but is spaced apart therefrom and, thus, does not encounter friction and/or wear thereon. As a result, the example electro-pneumatic converters disclosed herein are more wear-resistant than known electro-pneumatic converters.

In turn, the example electro-pneumatic converters disclosed herein have less bleed than known electro-pneumatic converters. In some instances, the flatness of the second side of the armature and/or the end of the solenoid (and the associated seal between the surfaces formed thereby) enables the example electro-pneumatic converters disclosed herein to achieve a leakage of less than 0.05 square cubic feet per hour (SCFH) of air at a supply pressure of 18 pounds per square inch (PSI). As such, the example electro-pneumatic converters disclosed herein are more efficient than known electro-pneumatic converters.

FIG. 1 illustrates a cross-sectional view of an example electro-pneumatic (I/P) converter 100 (referred to herein as the converter 100). The example converter 100 converts an electrical input signal into a pneumatic output signal (e.g., a pressure signal) by controlling a flow of pressurized fluid through the converter 100. In some examples, the pneumatic output signal is used to control a device, such as a pneumatic actuator for actuating a valve. In some examples, the pneumatic output signal is amplified via a pneumatic relay to a higher pressure and/or volumetric flow rate, which is then supplied to the actuator for actuating the valve.

In the illustrated example of FIG. 1, the converter 100 includes a body 102 defining an axial passageway 104 extending between a first opening 106 and a second opening 108. In FIG. 1, the body 102 includes a first portion (e.g., a cap) 110 and a second portion (e.g., a sleeve) 112. In FIG. 1, the cap 110 includes the first opening 106. In FIG. 1, the second portion 112 includes the second opening 108. In some examples, the second portion 112 provides a housing for a solenoid 114.

In the illustrated example of FIG. 1, the first opening 106 is associated with a supply port 115. In FIG. 1, the supply port 115 is to be fluidly coupled to a supply pressure source (e.g., plant air, process gas, etc.). In FIG. 1, a travel stop 116 is positioned in the axial passageway 104 proximate the first opening 106. In FIG. 1, the travel stop 116 includes a supply channel 118 extending between a first opening 120 and a second opening 122. In FIG. 1, the second opening 122 fluidly couples the supply channel 118 to the axial passageway 104.

In the illustrated example of FIG. 1, the cap 110 further includes a first output channel 124 extending between a first outer orifice (e.g., a first output port) 126 and a first inner orifice 128, and a second output channel 130 extending between a second outer orifice (e.g., a second output port) 132 and a second inner orifice 134. In FIG. 1, the first inner orifice 128 and the second inner orifice 134 are fluidly coupled to the axial passageway 104 via a recess 136 in the cap 110 corresponding to a portion of the axial passageway 104. As such, the output channels 124, 130 fluidly couple the output ports 126, 132 to the axial passageway 104. In FIG. 1, the travel stop 116 is positioned to protrude or extend into the recess 136 beyond an inner surface 138 of the recess 136 associated with the inner orifices 128, 134 such that the second opening 122 is farther away from a plane defined by the inner surface 138 of the recess 136 than the inner orifices 128, 134. In FIG. 1, the output channels 124, 130 are substantially parallel to the supply channel 118. In other examples, the output channels 124, 130 may extend substantially perpendicularly and/or at any other angle relative to the supply channel 118. The converter 100 operates to block or allow fluid flow between the supply port 115 and the output ports 126, 132 via the second opening 122 and the associated channel 118 of the travel stop 116. In some examples, the output ports 126, 132 are fluidly coupled to a downstream device that receives the pressurized fluid, which is considered a pneumatic output signal.

In the illustrated example of FIG. 1, the example converter 100 includes a spring 140, an armature (e.g., a plug or plunger) 142, and the solenoid 114 disposed within the axial passageway 104 to control the flow of fluid between the supply port 115 and the output ports 126, 132. In FIG. 1, the spring 140 and the armature 142 are generally disposed within the recess 136 of the cap 110 while the solenoid 114 is positioned within an inner wall 144 of the sleeve 112. In FIG. 1, the solenoid 114 includes a core 146 and a coil 148 and an associated bobbin 150 wrapped around the core 146. The core 146 may be constructed of a ferrous material (e.g., iron). In FIG. 1, the solenoid 114 further includes a first end (e.g., a supply end) 152 facing towards the supply port 115 of the converter 100 and a second end (e.g., an exhaust end) 154 opposite the first end 152. In FIG. 1, the supply end 152 of the solenoid 114 includes an interfacing surface 156 of the core 146 and an open surface 158 of the bobbin 150 and/or the coil 148. In FIG. 1, the interfacing surface 156 of the core 146 is closer to the supply port 115 than the open surface 158 of the bobbin 150 and/or the coil 148. In FIG. 1, the core 146 includes an exhaust passageway 160 between a first orifice 162 in the first end 152 of the solenoid 114 and a second orifice 164 in the second end 154 of the solenoid 114. In FIG. 1, an exhaust port 166 is positioned at an exterior of the converter 100. In some examples, the exhaust port 166 is associated with the second opening 108 and/or the second orifice 164.

In the illustrated example of FIG. 1, the spring 140 is disposed between the armature 142 and the cap 110. In some examples, the spring 140 is disposed between the armature 142 and the travel stop 116 and/or the output ports 126, 132. In FIG. 1, the spring 140 is a sheet including a first spiral cutout and a second spiral cutout (as discussed further in association with FIG. 3) that is normally in a flat plane when not subject to external forces deflecting portions of the spiral construction out of planar alignment. However, in other examples, other types of springs may be implemented. Additionally, in other examples, the spring 140 may be disposed in other locations.

In FIG. 1, the spring 140 is shown as different stepped portions corresponding to regions of the first and second spiral cutouts when deflected out of planar alignment by the tip of the travel stop 116 that extends beyond the inner surface 138 of the recess 136 against which an outer portion 186 of the spring 140 is secured. This deflection creates a biasing force within the spring 140 (and armature 142) that urges the spring towards the travel stop 116 such that the spring 140 and/or the armature 142 seals off the second opening 122. In FIG. 1, a first side 170 of the armature 142 is coupled to a second face 172 the spring 140. In some examples, the spring 140 and the armature 142 are separate components that are independently manufactured and subsequently affixed or rigidly attached to one another. For example, a middle portion (e.g., a central disc) 174 of the second face 172 of the spring 140 and the first side 170 of the armature 142 can be coupled via laser welding and/or spot welding. Manufacturing the spring 140 and the armature 142 as separate components that are subsequently connected can simplify and/or facilitate the design and fabrication of the components relative to the design and fabrication of a unitary component that accomplishes the purposes of both the spring 140 and the armature 142. In FIG. 1, a first face 168 of the spring 140 interfaces directly with the travel stop 116. In some other examples, the spring 140 includes an opening through which the travel stop 116 extends to allow the first side 170 the armature 142 to interface directly with the travel stop 116. In FIG. 1, a second side 176 of the armature 142 faces the solenoid 114. In FIG. 1, an outer perimeter 178 of the armature 142 connects the first side 170 to the second side 176.

In some examples, the spring 140 and/or the armature 142 include openings that align with and/or otherwise place the area between the armature 142 and the open surface 158 in fluid communication with the output channels 124, 130. Specifically, a center portion of the armature 142, which extends past a diameter of the core 146, is solid (e.g., without openings). An outer portion of the armature 142, which aligns with a portion of the coil 148 includes the openings to enable fluid to travel therethrough. The openings in the armature 142 enable equalization of the pressure acting on the first side 170 and the second side 176 of the armature 142, thereby enabling the spring 140 to have a reduced spring rate because there is no pressure differential on opposite sides of the armature 142.

In the illustrated example FIG. 1, the spring 140 and the armature 142 are positioned within a chamber 182. In FIG. 1, the chamber 182 is defined by the inner surface 138 of the cap 110, the first end 152 of the solenoid 114 (e.g., the interfacing surface 156 of the core 146, the open surface 158 of the bobbin 150 and/or of the coil 148), and the surface 180 of the sleeve 112. The chamber 182 can be fluidly coupled to the supply port 115, the output ports 126, 132, and/or the exhaust port 166 depending on a position of the armature 142. In FIG. 1, a diameter of the chamber 182 is larger than a diameter of the solenoid 114 and/or a diameter of an interior of the sleeve 112, which is defined by the inner wall 144. As a result, the flow rate of the pressurized fluid through the passageway 104 is not limited by the size of the solenoid 114 and different sized solenoids can be utilized within the converter 100. In FIG. 1, the openings in the outer portion of the armature 142 enable the chamber 182 to extend past the interfacing surface 156 of the core 146. As such, the chamber 182 is able to contain a larger volume of pressurized fluid. In turn, the converter 100 can provide the pneumatic output signal to the pneumatic relay and/or the actuator at an increased pressure compared to known converters.

In the illustrated example FIG. 1, the converter 100 includes a ring spacer 184 positioned within the chamber 182 between the second face 172 of an outer portion (e.g., an outer edge, an outer circumference) 186 of the spring 140 and the surface 180 of the sleeve 112. In some examples, the ring spacer 184 maintains a position of the outer portion 186 of the spring 140. That is, in some examples, the outer portion 186 of the spring 140 is held against the inner surface 138 of the recess 136 of the cap 110 by the ring spacer 184, which is held against the spring 140 by the surface 180 of the sleeve 112. In some examples, a diameter of the spring 140 is larger than a diameter of armature 142 to maintain a clearance between the outer perimeter 178 of the armature 142 and an interior surface of the ring spacer 184.

In the illustrated example FIG. 1, the armature 142 is moveable between a first position (e.g., an off position, a closed position, an unlatched position) and a second position (e.g., an on position, an open position, a latched position). In the illustrated example of FIG. 1, the spring 140 biases the armature 142 toward the off position in which the pressurized fluid is blocked from flowing through the output ports 126, 132. Specifically, in the off position, the spring 140 and/or the armature 142 contact (e.g., press against) the second opening 122 of the travel stop 116 to block the pressurized fluid from flowing through the supply channel 118 and into the chamber 182 and on through the output channels 124, 130. Further, in the off position, the armature 142 is spaced apart from the first end 152 of the solenoid 114 and also spaced apart from the surface 180 of the sleeve 112 (along the outer perimeter of the armature 142). In the off position, the exhaust port 166 and the output ports 126, 132 are fluidly coupled to the chamber 182, which enables the output ports 126, 132 to be vented to the atmosphere. More particularly, when the armature 142 is in the off position, residual pressurized fluid associated with the output channels 124, 130 may pass around the outer perimeter 178 of the armature 142 (e.g., passing through a gap between the armature 142 and the sleeve 112) and/or through holes extending through the armature 142. The pressurized fluid may then pass through a gap between the armature 142 and the interfacing surface 156 of the core 146 to reach the first orifice 162. In turn, the fluid flows through the exhaust passageway 160 and out the second orifice 164. As a result, the exhaust port 166 fluidly couples the passageway 104 to the atmosphere when the armature 142 is in the off position.

In the illustrated example FIG. 1, a controller 188 is electrically coupled to the coil 148 via wires 190. The controller 188 may energize the coil 148 by applying a current thereto. In turn, the current causes the coil 148 to produce a magnetic field, which causes the armature 142 to move to the on position (shown in FIG. 2). In the on position, the pressurized fluid is able to flow through the axial passageway 104 between the supply port 115 and the output ports 126, 132. Specifically, the magnetic field of the coil 148, when energized, causes the armature 142, which is constructed of a ferrous material (e.g., iron), to be attracted to the solenoid 114. Accordingly, the second side 176 of the armature 142 contacts the first end 152 of the solenoid 114 (more particularly, the interfacing surface 156 of the core 146) in response to the coil 148 producing the magnetic field. As a result, the armature 142 seals the first orifice 162 in the first end 152 of the solenoid 114 and, thus, the exhaust port 166 by closing off the gap through which pressurized fluid was able to pass when the armature 142 was in the off position. Further, in the on position, the armature 142 is spaced apart from the travel stop 116 to define a gap therebetween, which enables the supply port 115 and the output ports 126, 132 to be fluidly coupled to the chamber 182. As such, the pressurized fluid enters the chamber 182 through the supply channel 118 and exits the chamber 182 through the output channels 124, 130. In turn, the output ports 126, 132 provide the pressurized fluid to the pneumatic relay and/or the actuator as a pneumatic output signal.

In the illustrated example FIG. 1, the armature 142 moves about 0.0025 inches (in) between the off position and the on position. That is, in some examples, the gap between the armature 142 and the solenoid 114 (when in the off position) and the gap between the armature 142 and the travel stop 116 (when in the on position) corresponds to approximately 0.0025 in. In some other examples, the converter 100 may be designed such that the armature 142 has a shorter travel distance (e.g., as low as 0.001 in.) or a larger travel distance (e.g., up to 0.004 in.) in the passageway 104. For example, the flow rate of the converter 100 can be changed by adjusting the position of the travel stop 116 in the passageway 104. Specifically, if the travel stop 116 is moved further into the chamber 182 toward the solenoid 114, less space is created between the travel stop 116 and the armature 142 when the armature 142 moves to the on position (shown in FIG. 2). On the other hand, if the travel stop 116 is moved away from the solenoid 114 in the passageway 104, then more space is created between the travel stop 116 and the armature 142 when the armature 142 moves to the on position (shown in FIG. 2). As a result, the flow rate of the converter 100 is increased. Thus, the example converter 100 can provide an adjustable flow rate to obtain a desired pneumatic output signal. In some examples, the converter 100 is capable of operating at temperatures ranging from −60° C. to 85° C. Operating under such a large range of temperature conditions when the travel distance of the armature 142 is so small (e.g., about 0.0025 inches) makes it difficult to rely on elastomeric seals to seal off the first orifice 162 because of differences in the rates of thermal expansion of elastomers relative to the metallic material of the armature 142. Accordingly, in the illustrated example of FIG. 1, there is no elastomeric element adjacent the armature 142 to seal off the supply port 115 and/or the exhaust port 166. Rather, as outlined above, a reliable seal (e.g., that achieves leakage of less than 0.05 SCFH at 18 PSI) is achieved in response to manufacturing the armature 142 and the interfacing surface 156 of the solenoid 114 to be relatively flat (e.g., a flatness on both interfacing surfaces of less than 10 μm). In addition, materials of the cap 110, the spring 140, and the ring spacer 184 minimize or otherwise reduce a difference in thermal expansion rates.

In some examples, the controller 188 applies a first current to energize the coil 148 causing the armature 142 to move from the off position to the on position. In some examples, the first current is reduced compared to activating currents of known converters as the armature 142 moves a small distance (0.0025 in) without encountering any friction while moving from the off position to the on position. In addition, as shown in the illustrated example, a diameter of the armature 142 is larger than the diameter of the solenoid 114 to improve the magnetic efficiency of the converter 100, which enables the first current to be further reduced. Specifically, the larger diameter of the armature 142 enables the solenoid 114 to attract the armature 142 with a reduced magnetic field. As a result, the controller 188 can energize the coil 148 with a reduced current (i.e., the first current). In some examples, when the armature 142 is in the on position, the controller 188 reduces the first current to a second current as a reduced magnetic field can be utilized to attract the armature 142 when it is closer to the solenoid 114 (e.g., in the on position). As a result, the controller 188 and the solenoid 114 maintain the on position of the armature 142 and, in turn, a magnitude of the pneumatic output signal. By reducing the current, the controller 188 uses less energy to supply the pneumatic output signal to the actuator and/or the pneumatic relay.

Figure 3:
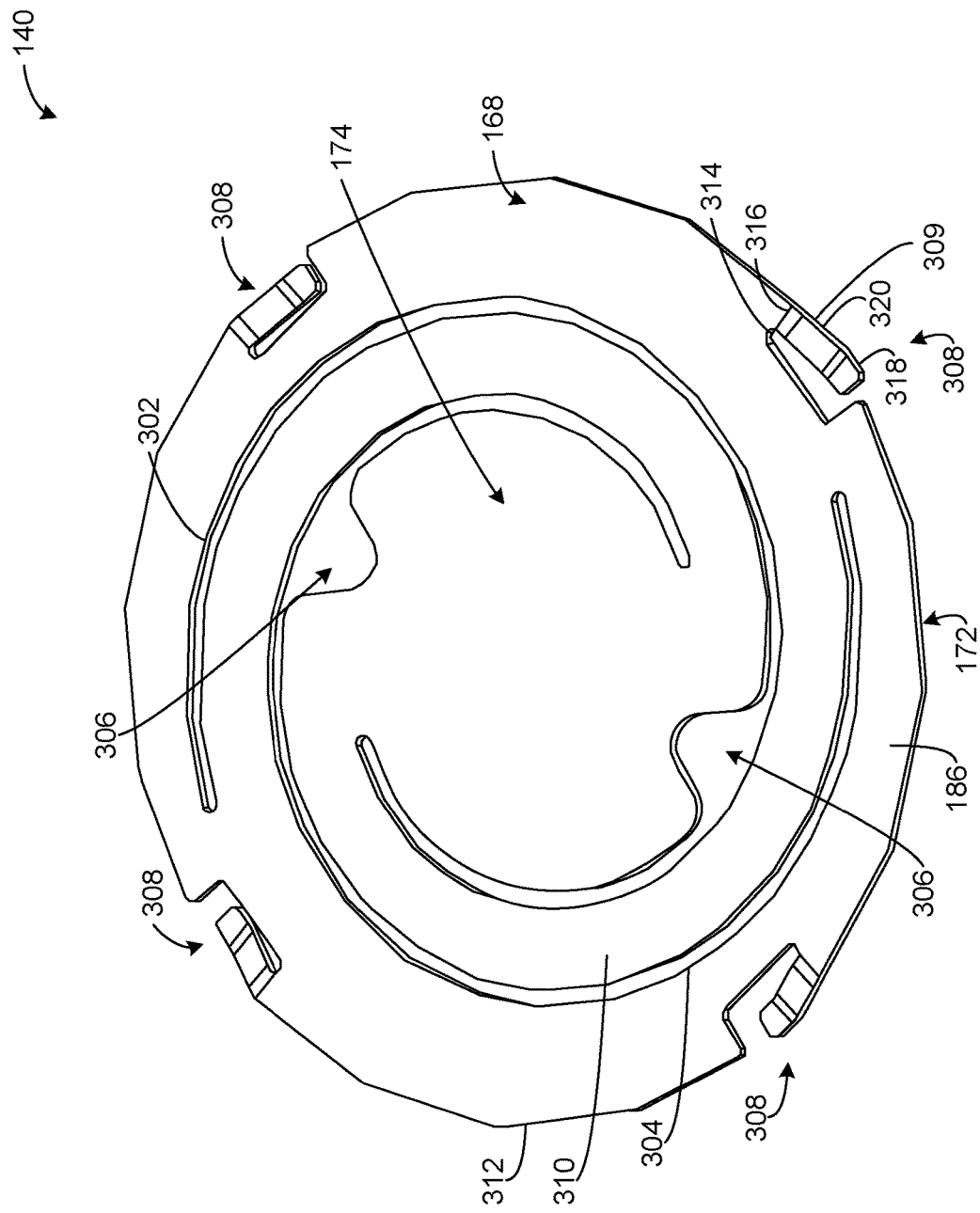
FIG. 3 illustrates an example spring of the example electro-pneumatic converter of FIGS. 1 and/or 2.

In the illustrated example FIG. 1, the spring 140 includes at least one arm or tab 192 extending from the second face 172 of the spring 140 in a direction of the solenoid 114, as discussed further in association with FIG. 3. In the illustrated example of FIG. 1, the tab 192 is at least partially compressed between the ring spacer 184 and the cap 110 to introduce a spring force in addition to the compressive forces to help securely maintain the spring 140 against the cap 110. For purposes of illustration, the tab 192 is shown being compressed flat so as to be co-planar with the rest of the outer portion 186 of the spring 140. However, in other examples, depending on the dimensions of the cap 110 and the ring spacer 184, the tab 192 to may protrude away from the rest of the outer portion 186 towards the ring spacer 184. In some examples, multiple tabs 192 are located at circumferentially spaced apart locations along the outer portion 186 of the spring 140 to apply a load at different circumferentially spaced apart points along the ring spacer 184 to stabilize a position of the spring 140. Accordingly, the tabs 192 bias the rest of the spring 140 in a direction towards the cap 110. As such, the spring 140 is sandwiched between the inner surface 138 of the cap 110 and the ring spacer 184 when the cap 110 contacts the surface 180 of the sleeve 112. In some examples, the tabs 192 allow a gap between the cap 110 and the spring 140 to be eliminated or otherwise reduced, which enables the spring 140 to be affixed to the cap 110 via laser welding and, thus, creates an airtight seal therebetween. In some other examples, the tabs 192 contact the surface 180 of the sleeve 112 to maintain and/or stabilize the position of the spring 140.

In some examples, the second side 176 of the armature 142 and the interfacing surface 156 of the core 146 both include a flatness of less than 10 μm to maximize and/or otherwise improve sealing that results from contact therebetween. As such, the converter 100 achieves a leakage of less than 0.05 SCFH at 18 PSI. In FIG. 1, the middle portion 174 of the spring 140 has a larger diameter than the core 146. In some examples, the laser welding and/or spot welding that couples the armature 142 to the spring 140 occurs along a portion of the armature 142 that is positioned radially outside a circumference of the interfacing surface 156 of the core 146. As a result, the laser welding and/or spot welding avoids impacting the flatness of the armature 142 in a sealing portion of the armature 142.

In the illustrated example FIG. 1, the output ports 126, 132 are positioned on opposite sides of the supply channel 118 and, thus, opposite sides of the passageway 104. In some examples, by providing flow paths on opposite sides of the passageway 104, the fluid being vented from the output ports 126, 132 when the armature 142 is in the off position acts on the first side 170 of the armature 142 in a symmetrical manner. As a result, a force acting on the first side 170 of the armature 142 in the off position is balanced, which prevents the spring 140 and/or the armature 142 from becoming misaligned and/or uncovering a portion of the supply channel 118. In some examples, the output channels 124, 130 are substantially parallel to a central axis of the passageway 104 to guide the fluid being vented on an efficient path past the spring 140 and/or the armature 142. In some examples, the spring 140 and/or the armature 142 include openings to enable the fluid being vented to pass directly therethrough. In turn, the output ports 126, 132 minimize and/or otherwise reduce the force on the first side 170 of the armature 142 when the armature 142 is in the off position.

In the illustrated example FIG. 1, the interfacing surface 156 of the core 146 includes grooves 194. In some examples, the grooves 194 are positioned around the first orifice 162 in the first end 152 of the solenoid 114 to provide a pathway for the pressurized fluid to flow between the core 146 and the second side 176 of the armature 142 when the armature 142 is sealing the first orifice 162 in the on position, as discussed further in association with FIG. 5. As such, the grooves 194 can help disperse the pressurized fluid evenly throughout the chamber 182 when the armature 142 is in the on position. Accordingly, the grooves 194 reduce a pressure imbalance across the armature 142, which enables the spring 140 to bias the armature from the on position to the off position with a reduced spring force compared to a scenario where the interfacing surface 156 of the core 146 does not include the grooves 194.

In the illustrated example FIG. 1, seals (e.g., o-rings) 196 are positioned around the solenoid 114 to maintain a position thereof and/or prevent fluid from flowing around the solenoid 114 such that fluid is limited to travel between opposite ends of the solenoid 114 via the central exhaust passageway 160. In FIG. 1, a seal (e.g., an o-ring) 198 is positioned around the travel stop 116 to maintain a position thereof and/or prevent fluid from flowing around the travel stop 116 such that fluid is limited to travel between opposite ends of the travel stop 116 via the central channel 118. In FIG. 1, seals 199 are positioned around the cap to fluidly seal the converter 100 in a process control device (e.g., a valve controller).

Figure 2:
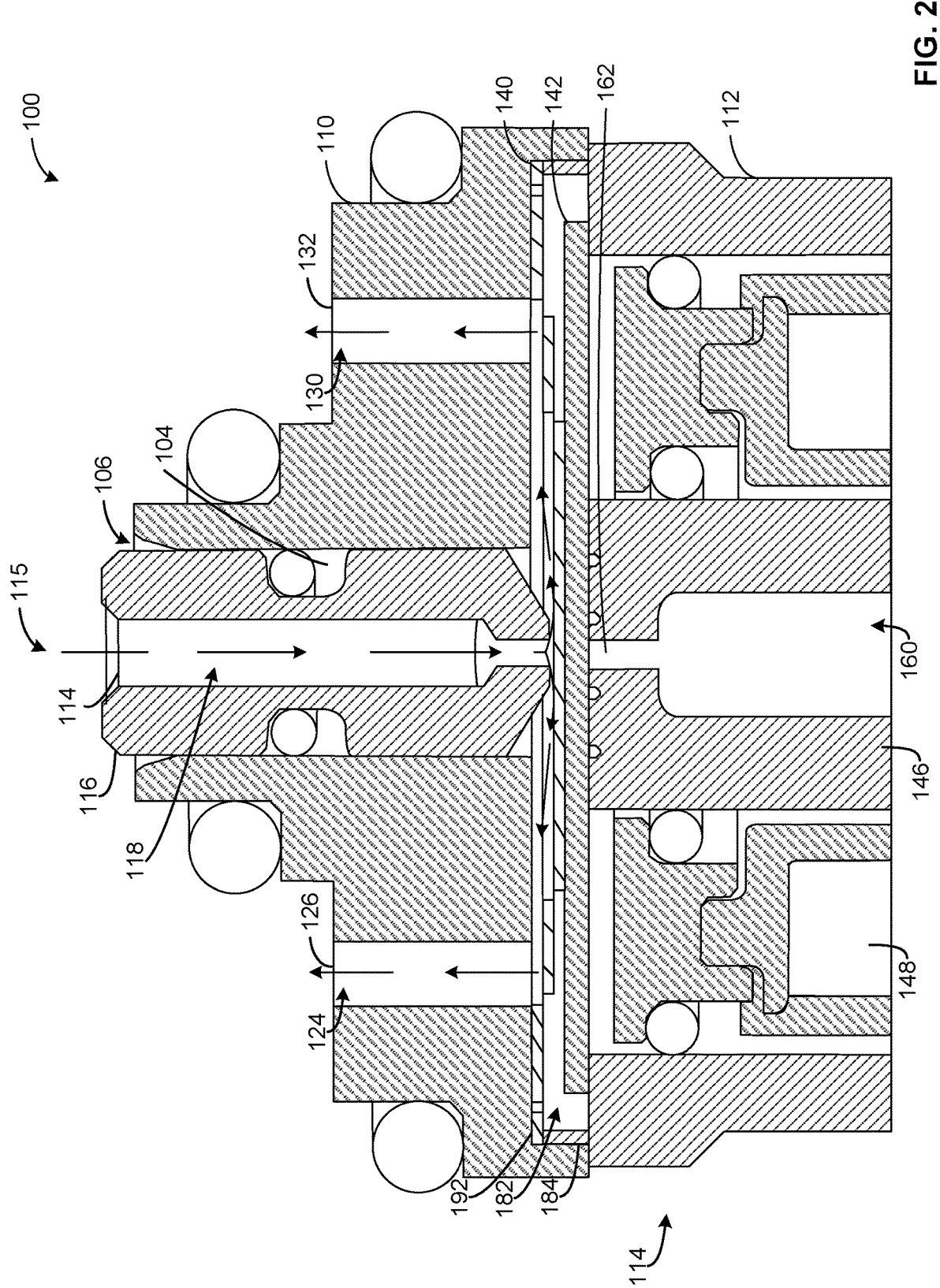
FIG. 2 illustrates a magnified view of the example electro-pneumatic converter of FIG. 1.

FIG. 2 illustrates a magnified view of the example electro-pneumatic converter 100. In the illustrated example FIG. 2, the armature 142 is in the on position. That is, the coil 148 is energized to produce a magnetic field as a result of a current being applied thereto. In turn, the armature 142 is attracted to the magnetic field of the coil 148, which moves the armature 142 away from the travel stop 116 and into contact with the solenoid 114. In FIG. 2, the supply port 115 receives the pressurized fluid from a supply source. In FIG. 2, the supply channel 118 guides the pressurized fluid into the chamber 182 past a gap between the armature 142 (and spring 140) and the tip of travel stop 116. In FIG. 2, the armature 142 covers the first orifice 162 at the first end 152 of the solenoid 114 to prevent the pressurized fluid from escaping through the exhaust port 166. In turn, the pressurized fluid exits the chamber 182 through the output channels 124, 130. As a result, the pressurized fluid becomes a pneumatic output signal, which the output ports 126, 132 provide to a downstream device, such as a pneumatic relay and/or a pneumatic actuator for actuating a valve.

FIG. 3 illustrates the example spring 140 of the converter 100 of FIGS. 1 and/or 2. In the illustrated example FIG. 3, the spring 140 is a sheet including a first spiral cutout (e.g., a first spiral slot) 302, a second spiral cutout (e.g., a second spiral slot) 304, holes 306 separate from the spiral cutouts 302, 304, and notches 308. In FIG. 3, the spring 140 further includes ones of the tabs 192, as described in association with FIG. 1, extending from ones of the notches 308. In FIG. 3, the spring 140 includes the first face 168 and the second face 172. In some examples, the first face 168 faces the cap 110 and the second face 172 faces the armature 142 and the solenoid 114 of FIG. 1.

In the illustrated example FIG. 3, a portion of the first spiral cutout 302 is positioned within (e.g., extends between) different portions of the second spiral cutout 304. In FIG. 3, a portion of the second spiral cutout 304 is positioned within (e.g., extends between) different portions of the first spiral cutout 302. In some examples, the first spiral cutout 302 and the second spiral cutout 304 are concentrically positioned within the sheet. In some examples, each of the first spiral cutout 302 and the second spiral cutout 304 follow an arced path that extends more than 180 degrees. In some examples, the arc of each of the each of first spiral cutout 302 and the second spiral cutout 304 extends approximately 360 degrees. In some examples, each arc may extend more or less than 360 degrees (e.g., about 270 degrees, about 350 degrees, about 360 degrees, about 375 degrees, etc.).

In the illustrated example of FIG. 3, the first spiral cutout 302 and the second spiral cutout 304 define elongated spiral arms 310 that extend between the middle portion or central disc 174 of the spring 140 and the outer portion or outer ring 186. In some examples, an arc of each spiral ring extends more than 90 degrees and may extend as much as approximately 180 degrees. In some examples, the arcs of the spiral arms 310 may extend more than 180 degrees.

In the illustrated example of FIG. 3, the second face 172 of the middle portion 174 of the spring 140 is rigidly affixed to the first face 168 of the armature 142. For example, the second face 172 of the middle portion 174 can be spot welded and/or laser welded to the first side 170 of the armature 142. The spiral arms 310 between the central disc 174 and the outer ring 186 are resilient to enable the central disc 174 to be deflected out of the plane of the spring 140 associated with the outer ring 186. As a result, when outer ring 186 is held against the inner surface 138 of the cap 110, the tip of the travel stop 116 pushes the central disc 174 out of the plane of the outer portion 186 as shown in FIG. 1. The deflection in the spring 140 by the travel stop 116 creates a spring force in the spring 140 that biases the spring 140 (and the attached armature 142) toward the plane of the outer ring 186 and against the second opening 122 of the supply channel 118 of the travel stop 116. As a result, the spring 140 and the attached armature 142 are biased away from the solenoid 114 when the coil 148 is not energized (e.g., in the off position of the armature 142) to place the outputs ports 126, 132, the chamber 182, and the exhaust port 166 in fluid communication. In addition, the biasing force in the spring 140 created by its deflection caused by the travel stop 116 urges the first face 168 of the middle portion 174 of the spring 140 (which is structural reinforced by the armature 142) into contact with the second opening 122 of the supply channel 118 of the travel stop 116 to prevent the pressurized fluid from traveling through the supply channel 118 and entering the chamber 182 when the armature 142 is in the off position.

In the illustrated example of FIG. 3, the holes 306 in the spring 140 enable the output ports 126, 132 to be easily vented to the atmosphere when the armature 142 is in the off position. For example, the holes 306 can be aligned with the output channels 124, 130 or portions thereof to provide a path for fluid to travel from the output ports 126, 132 to the first orifice 162 in the first end 152 of the solenoid 114 when the armature 142 is in the off position. In some examples, the holes 306 enable the pressurized fluid to be dispersed throughout the chamber 182 and/or seamlessly enter the output channels 124, 130 when the armature 142 is in the on position. In some examples, the armature 142 includes holes and/or openings that align with the holes 306 in the spring 140 to disperse the pressurized fluid throughout the chamber 182. In FIG. 3, the holes 306 extend off the first spiral cutout 302 and the second spiral cutout 304. In some other examples, the holes 306 are spaced apart from the first spiral cutout 302 and the second spiral cutout 304, as discussed further in association with the illustrated example of FIG. 5.

In the illustrated example of FIG. 3, the notches 308 are positioned along the outer perimeter 312 of the spring 140. In FIG. 3, ones of the tabs 192 extend from a side 314 of the notches 308. More particularly, in some examples, the notches 308 are formed by cutting out the shape of the tab 192 in the metal sheet of the spring 140 and then bending the tab 192 to extend away from the plane of the sheet. In FIG. 3, the tab 192 includes a first end 316 coupled to a main body of the spring 140, a second end 318 that is spaced apart from the main body of the spring 140, and a pitch 320 that extends between the first and second ends 316, 318. In FIG. 3, the pitch 320 extends at an angle away from the plane of the sheet (e.g., away from a plane of the first face 168). In FIG. 3, the second end 318 extends from the pitch 320 along a plane that is substantially parallel to the plane of the sheet.

In some examples, the spring 140 is positioned within the converter 100 so that the second end 318 of the tabs 192 extend away from the inner surface 138 of the cap 110. As a result, when the converter 100 is assembled, the second end 318 of the tabs 192 contact the surface of the ring spacer 184 and resiliently urge the outer portion 186 of the spring 140 away from the solenoid 114 to provide a force that secures the spring 140 against the cap in a manner that reduces the likelihood of the spring 140 inadvertently moving. In some examples, a stiffness of the tabs 192 is significantly greater (e.g., approximately 20 times greater) than a stiffness of the spiral arms 310. As such, the stiffness of the tabs 192 maintains a position of the outer portion 186 of the spring 140 while allowing the middle portion 174 of the spring 140 to move with the armature 142 in response to the solenoid 114 activating or deactivating. In some other examples, the pitch 320 and/or the second end 318 of the tab 192 extend past the inside diameter of the ring spacer 184 such that the tab 192 contacts the surface 180 of the sleeve 112 to maintain a position of the spring 140 in the chamber 182 and, in turn, a biased position of the armature 142.

Figure 4:
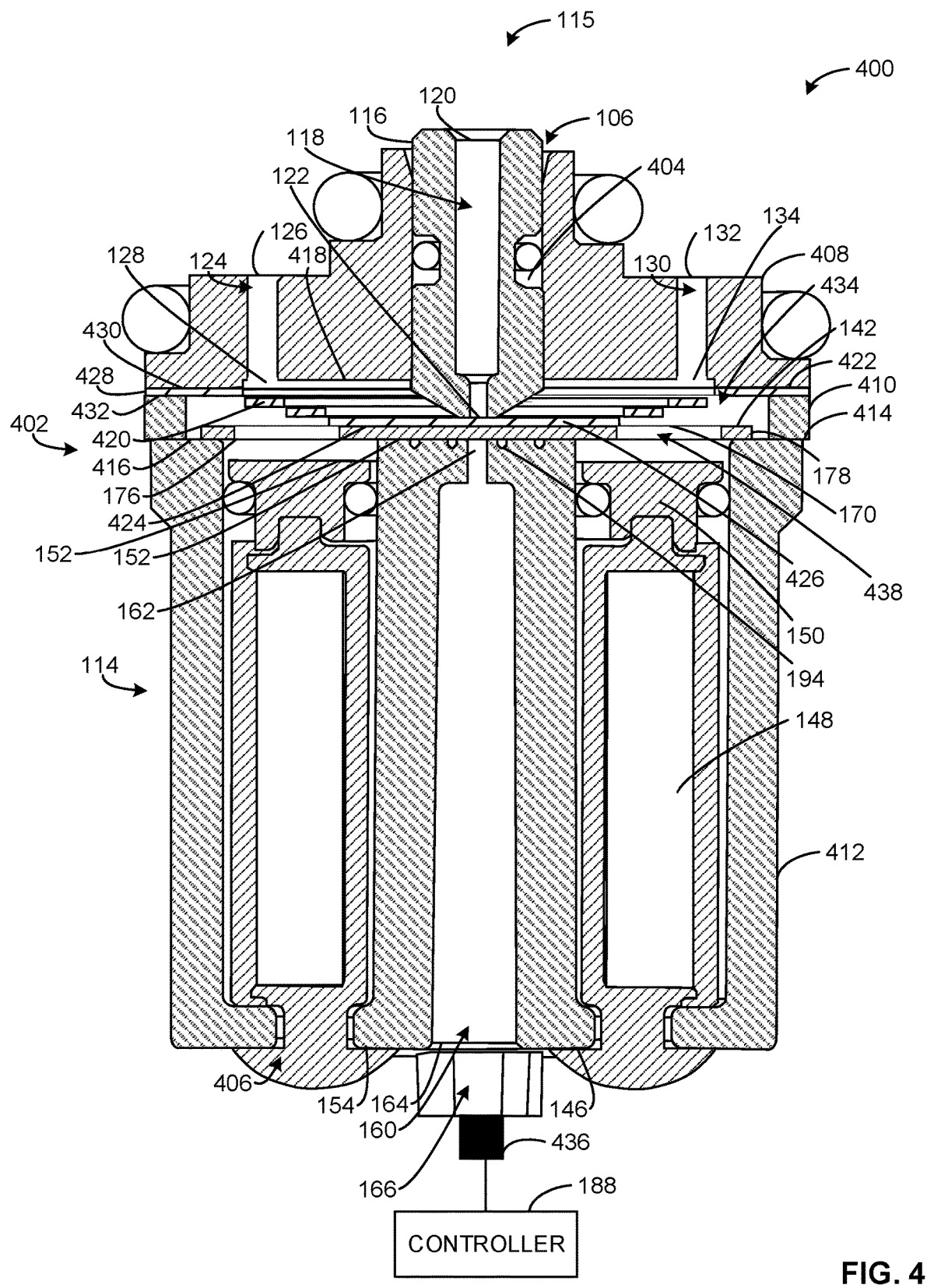
FIG. 4 illustrates a cross-sectional view of another example electro-pneumatic converter.

FIG. 4 illustrates a cross-sectional view of another example electro-pneumatic converter 400 (referred to herein as the converter 400). The example converter 400 converts an electrical input signal into a pneumatic output signal (e.g., a pressure signal) by controlling a flow of pressurized fluid through the converter 400, similar to the converter 100 of FIG. 1. Accordingly, the pneumatic output signal can be supplied to a pneumatic relay and/or an actuator for actuating a valve. For purposes of explanation, similar reference numerals are used for components in FIG. 4 that are similar to components shown in FIGS. 1-3. While some of these similar components in the different examples may be substantially identical, in some examples, the components may have minor differences in design and/or structure that are suitably adapted to the particular example converter 100, 400 in which the components are implemented. More significant differences in the components of the two converters 100, 400 are identified through the use of different reference numerals.

In FIG. 4, the converter 400 includes a body 402 defining an axial passageway 404 between the first opening 106 and a second opening 406. In FIG. 4, the body 402 includes a first portion (e.g., a cap) 408, a second portion (e.g., a wall, an intermediate portion) 410, and a third portion (e.g., a sleeve, a housing of the solenoid 114) 412. In FIG. 4, the wall 410 is fixed to the sleeve 412. In some examples, the wall 410 is integrally attached to the sleeve 412. That is, the wall 410 and the sleeve 412 are a unitary component. In some other examples, a first surface 414 of the wall 410 is coupled to a surface 416 the sleeve 412 via welding, a fastener, and/or an adhesive.

In the illustrated example of FIG. 4, the cap 408 includes the first opening 106 of the axial passageway 404. In FIG. 4, the sleeve 412 includes the second opening 406. In some examples, the first opening 106 is fluidly coupled to the supply port 115 and the second opening 406 is fluidly coupled to the exhaust port 166. In FIG. 4, the cap 408 further includes the first output channel 124 extending between the first output port 126 and the first inner orifice 128, and the second output channel 130 extending between the second output port 132 and the second inner orifice 134. In FIG. 4, the first inner orifice 128 and the second inner orifice 134 are fluidly coupled to the axial passageway 404 via a recessed surface (e.g., a divot, an indentation, etc.) 418 in the cap 110 corresponding to a portion of the axial passageway 404. Specifically, in FIG. 4, the recessed surface 418 extends between the first inner orifice 128 and the second inner orifice 134. Accordingly, the output channels 124, 130 fluidly couple the output ports 126, 132 to the axial passageway 404. In FIG. 4, the travel stop 116 is positioned in the axial passageway 404 proximate the first opening 106.

In the illustrated example of FIG. 4, the converter 400 further includes a spring 420 disposed within the axial passageway 404 between the armature 142 and the cap 110. In FIG. 4, the spring 420 is a sheet (e.g., a flat plane) including a first spiral cutout and a second spiral cutout, as discussed further in association with FIG. 5. However, as shown in FIG. 4, the spring 420 is deflected out of planar alignment with different stepped portions (as they appear in FIG. 4) corresponding to regions of the spring between the first and second spiral cutouts. More particularly, the spring 420 is not shown as being in a flat plane because a first face 422 of the spring 420 interfaces with the travel stop 116 (similar to the spring 140 of FIG. 1) to deflect the central portion of the spring 420 out of planer alignment with an outer portion 428 of the spring 420 held against a surface of the cap 408. In FIG. 4, the converter 400 includes the armature 142 of FIG. 1. In FIG. 4, the spring 420 is disposed between the cap 110 and the armature 142. In FIG. 4, the first side 170 of the armature 142 is coupled to a second face 424 of the spring 420. For example, a middle portion (e.g., a central disc) 426 of the spring 420 of the second face 424 of the spring 420 and the first side 170 of the armature 142 can be coupled via laser welding and/or spot welding.

In the illustrated example of FIG. 4, an outer portion 428 of the spring 420 is fixed between a surface 430 of the cap 408 opposite the first opening 106 and a second surface 432 of the wall 410 opposite the second opening 406. That is, the outer portion 428 of the spring 420 is sandwiched between the cap 408 and the sleeve 412. In FIG. 4, the surface 430 of the cap 408 is farther away from the first opening 106 than the recessed surface 418. As such, the cap 408 and the wall 410 maintain a position of the outer portion 428 of the spring 420. In some examples, the first face 422 of the outer portion 428 of the spring 420 is coupled to the surface 430 of the cap 408 and the second face 424 of the outer portion 428 of the spring 420 is coupled to the wall 410 via welding, a fastener, and/or an adhesive. In some examples, the spring 420 is integrally attached to the wall 410 and/or the cap 408. That is, the spring 420, the wall 410, and/or the cap 408 can be a unitary component.

In the illustrated example of FIG. 4, the spring 420 biases the armature 142 toward the off position. As such, the spring 420 contacts the second opening 122 and is reinforced by the armature 142, which seals the supply channel 118 and blocks the pressurized fluid from traveling therethrough. In some examples, the spring 420 includes an opening through which the travel stop 116 extends allowing the armature 142 to contact the second opening 122 to block the supply channel 118. In FIG. 4, the spring 420 and the armature 142 are disposed within a chamber 434 (similar to the chamber 182 of FIG. 1). In FIG. 4, the chamber 434 is defined by the surface 430 of the cap 408, the recessed surface 418 of the cap 408, the interior surface of the wall 410, the surface 416 of the sleeve 412, and the end 152 of the solenoid 114. The chamber 434 can be fluidly coupled to the supply channel 118, the output channels 124, 130, and/or the exhaust passageway 160 depending on a position of the armature 142. In FIG. 4, the travel stop 116 is positioned to protrude or extend into the chamber 434. As shown in FIG. 4, the armature 142 includes openings (e.g., gaps, holes, etc.) 438 that align with and/or otherwise place the area between the armature 142 and the open surface 158 of the coil 148 and/or the bobbin 150 in fluid communication with the chamber 434. As such, the openings 438 place areas of the chamber 434 on opposite sides of the armature 142 in fluid communication. In some examples, a portion of the first side 170 of the armature 142 that is to be positioned between the openings 438 and the interfacing surface 152 of the core 146 of the solenoid 114 is laser welded and/or spot welded to the second face 424 of the middle portion 426 of the spring 420.

In the illustrated example of FIG. 4, the controller 188 is electrically coupled to the coil 148 of the solenoid 114 via a wire 436. As such, the controller 188 can energize the coil 148 by applying a current thereto. Accordingly, the controller 188 can control the current applied to the coil 148 to move the armature 142 between the off position and the on position and, thus, seal the supply channel 118 or the exhaust passageway 160 as desired.

In the illustrated example of FIG. 4, the recessed surface 418 of the cap 408 enables fluid to be evenly dispersed throughout the chamber 434. For example, the recessed surface 418 can enable the fluid being vented from the output ports 126, 132 to be evenly dispersed throughout the chamber 434 when the armature 142 is in the off position. As such, when the armature 142 is in the off position, a force on the first face 422 of the spring 420 and/or the first side 170 of the armature 142 is evenly distributed to prevent the spring 420 and/or the armature 142 from becoming misaligned. In addition, the recessed surface 418 increases the volume of the chamber 434, which enables the converter 400 to produce and/or intake higher flow rates.

Figure 5:
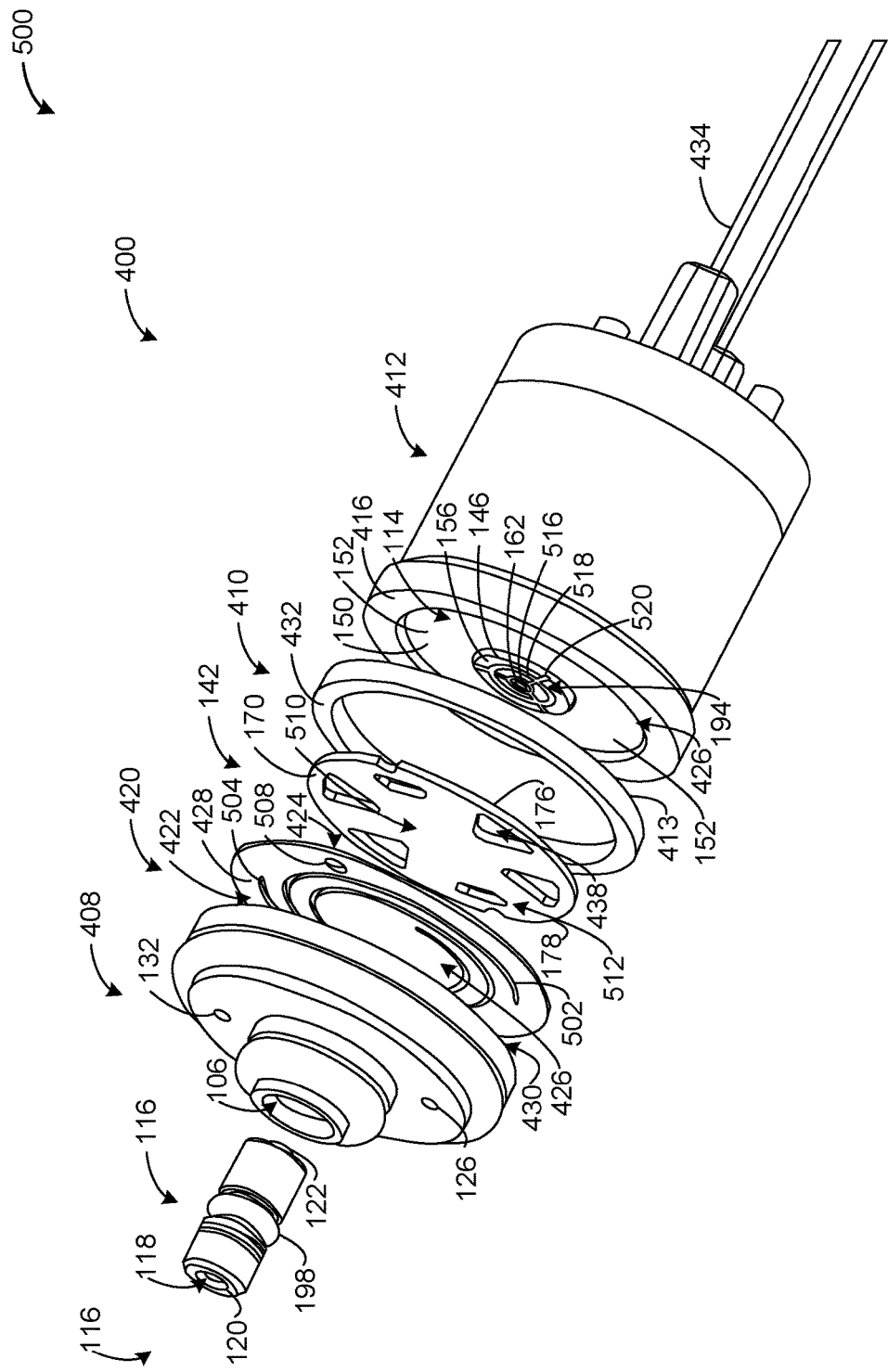
FIG. 5 illustrates an example exploded view of the example electro-pneumatic converter of FIG. 4.

FIG. 5 illustrates an example exploded view 500 of the electro-pneumatic converter 400 of FIG. 4. The exploded view 500 includes the travel stop 116, the cap 408, the spring 420, the armature 142, the wall 410, and the sleeve 412 as separate components for clarity. In FIG. 5, the solenoid 114 is positioned within the sleeve 412.

In the illustrated example of FIG. 5, the travel stop 116 includes the supply channel 118 extending between the first opening 120 and the second opening 122. In some examples, the supply port 115 is in fluid communication with a pressure supply source. In FIG. 5, the seal 198 is wrapped around a midsection of the travel stop 116. As such, the seal 198 maintains a position of the travel stop 116 proximate the first opening 106 of the axial passageway 404. In addition, the seal 198 prevents fluid from traveling between the travel stop 116 and an interior wall of the first opening 106 of the axial passageway 404 included in the cap 408. In FIG. 5, the cap 408 further includes the output ports 126, 132 through which the pressurized fluid flows when the armature 142 is in the on position. In some examples, the output ports 126, 132 are fluidly coupled to a pneumatic relay and/or an actuator that controls a position of a valve.

In the illustrated example of FIG. 5, the first face 422 of the spring 420 faces the cap 408 and the second face 424 of the spring 420 faces the armature 142. In FIG. 5, the spring 420 is a metal sheet including a first spiral cutout or slot 502 and a second spiral cutout or slot 504 similar to the cutouts or slots 302, 304 shown in FIG. 3. In FIG. 5, an inner portion of the first spiral cutout 502 is positioned within the second spiral cutout 504. Further, an inner portion of the second spiral cutout 504 is positioned within the first spiral cutout 502. In FIG. 5, the midsection 426 of the spring 420 is positioned within the inner portion of the first spiral cutout 502 and the inner portion of the second spiral cutout 504. In FIG. 5, the spring 420 further includes elongated spiral arms 506 that extend between the outer portion 428 and the midsection 426 of the spring 420. In some examples, an arc of each spiral arm 506 extends more than 90 degrees and may extend as much as approximately 180 degrees (e.g., 180 degrees+/−10 degrees). In some examples, the arcs of the spiral arms 506 may extend more than 180 degrees.

In the illustrated example of FIG. 5, the spring 420 further includes openings (e.g., holes) 508 positioned along the outer portion 428 of the spring 420 separate from the first and second spiral cutouts 502, 504. In some examples, the openings 508 are positioned in the spring 420 at a location that is to be between the second surface 430 of the cap 408 and the second surface 432 of the wall 410. In some such examples, the openings 508 are utilized to align the armature 142 with the spring 420 during a welding process that affixes the armature 142 to the spring 420.

In the illustrated example of FIG. 5, the first side 170 of the armature 142 faces toward the spring 420 and the second side 176 of the armature 142 faces toward the solenoid 114. In some examples, the first side 170 of the armature 142 is rigidly fixed to the midsection 426 of the spring 420 via laser welding and/or spot welding. Manufacturing the spring 420 and the armature 142 as separate components that are subsequently connected can simplify and/or facilitate the design and fabrication of the components relative to the design and fabrication of a unitary component that accomplishes the purposes of both the spring 420 and the armature 142. In some examples, the outer perimeter 178 of the armature 142 is dimensioned so as to be separated from the wall 410 to prevent friction that would otherwise cause the armature 142 to wear.

In the illustrated example of FIG. 5, the armature 142 includes an inner portion 510 and an outer portion 512. In some examples, the inner portion 510 of the armature 142 is coupled to the midsection 426 of the spring 420. In some examples, the inner portion 510 of the armature 142 contacts the interfacing surface 156 of the core 146 when the armature 142 is in the on position. In some examples, the armature 142 includes a larger diameter than the solenoid 114 such that the outer portion 512 of the armature 142 contacts the surface 416 of the sleeve 412 when the armature 142 is in the on position. As a result, the position of the armature 142 is stabilized by the contact forces between the surface 416 of the sleeve 412 and the second side 176 of the outer portion 512 of the armature 142, which prevents and/or otherwise reduces lateral movements of the armature 142 between the wall 410 to minimize and/or otherwise reduce friction encountered by the second side 176 of the inner portion 510 of the armature 142. Further, the contact forces between the surface 416 of the sleeve 412 and the second side 176 of the outer portion 512 of the armature 142 prevent misalignment of the armature 142. Accordingly, the stabilized position of the armature 142 in the on position maintains a sealing capability thereof. In some examples, the inner portion 510 of the armature 142 is dimensioned to be larger than a perimeter of the core 146 and overhangs the open surface 158 of the bobbin 150 and/or the coil 148. In some examples, the inner portion 510 of the armature 142 reinforces the midsection 426 of the spring 420 to block the supply channel 118 when the armature 142 is in the off position. In some other examples, the inner portion 510 of the armature 142 directly blocks the supply channel 118 when the midsection 426 of the spring 420 includes an opening for the travel stop 116 to extend through.

In the illustrated example of FIG. 5, the armature 142 includes the openings 438 disposed around the outer portion 512 thereof. In some examples, the openings 438 allow fluid to flow through the outer portion 512 of the armature 142 and be evenly distributed throughout the chamber 434. In some examples, the openings 438 are positioned adjacent the space next to the open surface 158 of the bobbin 150 and/or the coil 148. In some examples, the openings 438 in the armature 142 enable the chamber 434 of FIG. 4 (and/or the chamber 182 of FIG. 1) to contain a larger volume of fluid. Specifically, the reduced height of the open surface 158 of the bobbin 150 and/or the coil 148 compared to the interfacing surface 156 of the core 146, which the armature 142 contacts in the on position, enables the fluid to flow between the outer portion 512 of the armature 142 and the open surface 158 of the solenoid 114. In addition, the openings 438 provide a sufficient flow area for the fluid to flow between the output channels 124, 130 and the first orifice 162 in the first end 152 of the solenoid 114 when the armature 142 is in the off position.

In the illustrated example of FIG. 5, the openings 438 balance the pressure acting on the first and second sides 170, 176 of the armature 142. As a result, the converter 400 of FIG. 4 (and/or the converter 100 of FIG. 1) can provide pneumatic output signals at an increased pressure compared to some known converters. A geometry of the openings 438 enables a weight of the armature to be minimized without negatively impacting a magnetic efficiency thereof. Further, a spring force of the spring 420 can be minimized or otherwise reduced as the openings 438 prevent an uneven pressure buildup against the first side 170 of the armature 142 compared to the second side 176. Specifically, if the armature 142 were to not have the openings 438, the spring 420 would require a greater spring force to overcome the pressure differential between the first and second sides 170, 176 of the armature 142 when moving the armature 142 from the on position to the off position. In turn, the reduced spring force of the spring 420 allows a reduced current through the coil 148 to attract the armature to the on position. As a result, the converter 400 of FIG. 4 (and/or the converter 100 of FIG. 1) utilizes less power to produce the pneumatic output signal.

In the illustrated example of FIG. 5, the first surface 414 of the wall 410 faces the sleeve 412 and the second surface 432 of the wall 410 faces the spring 420. In some examples, the wall 410 is coupled to the sleeve 412, the cap 408, and/or the spring 420 via welding and/or fasteners. In some examples, the fasteners pass between the cap 408 and the wall 410 through the openings 508 in the spring 420 to couple the cap 408, the spring 420, and the wall 410, which maintains a position of the outer portion 428 of the spring 420. In some other examples, the wall 410 is integrally attached to the sleeve 412 and/or the spring 420.

In the illustrated example of FIG. 5, the sleeve 412 is positioned around the solenoid 114. In FIG. 5, the surface 416 of the sleeve 412 is aligned at least partially with the wall 410. In FIG. 5, the interfacing surface 156 of the core 146 includes the grooves 194 positioned around the first orifice 162 in connection with the exhaust passageway 160. In FIG. 5, the grooves 194 include an inner ring 516, an outer ring 518, and lines 520 extending radially outward from the inner ring 516 and through the outer ring 518 and a perimeter of the interfacing surface 156. In FIG. 5, the first orifice 162 is positioned concentrically within the inner ring 516 and does not contact any of the grooves 194. That is, the grooves 194 are not in fluid communication with the first orifice 162 when the armature 142 is in the on position because the armature 142 engages the interfacing surface 156 between the orifice 162 and the grooves 194.

In the illustrated example of FIG. 5, the grooves 194 form passageways between the second side 176 of the armature 142 and the first end 152 of the solenoid 114 when the armature 142 is in contact with the solenoid 114. More particularly, as shown in this example, the groove lines 520 extend radially outward all the way to the edge of the interfacing surface 156 thereby placing the grooves 194 in fluid communication with the chamber 434 even when the armature 420 is in the on position against the interfacing surface 156. As such, the fluid can flow through the grooves 194 to balance a pressure within the chamber 434 and, in turn, balance a pressure on the armature 142. In FIG. 5, the wires 436 are operatively coupled to the controller 188 and to the coil 148 through the second end 154 of the solenoid 114. As such, the controller 188 can energize the coil 148 to move the armature 142 to the on position and enable the converter 400 to produce a pneumatic output signal. In some examples, the interfacing surface 156 of the core 146 includes fewer grooves 194 and/or smaller grooves 194 than shown in FIG. 5 to minimize or otherwise reduce a power utilized by the converter 400 of FIG. 4 (and/or the converter 100 of FIG. 1) to move the armature 142 to the on position inasmuch as the grooves 194 negatively impact the magnetic performance of the coil 148. In some other examples, the interfacing surface 156 of the core 146 includes more grooves 194 or larger grooves 194 than shown in FIG. 5 to increase a pressure balance on opposite sides of the armature 142.

Figure 6:
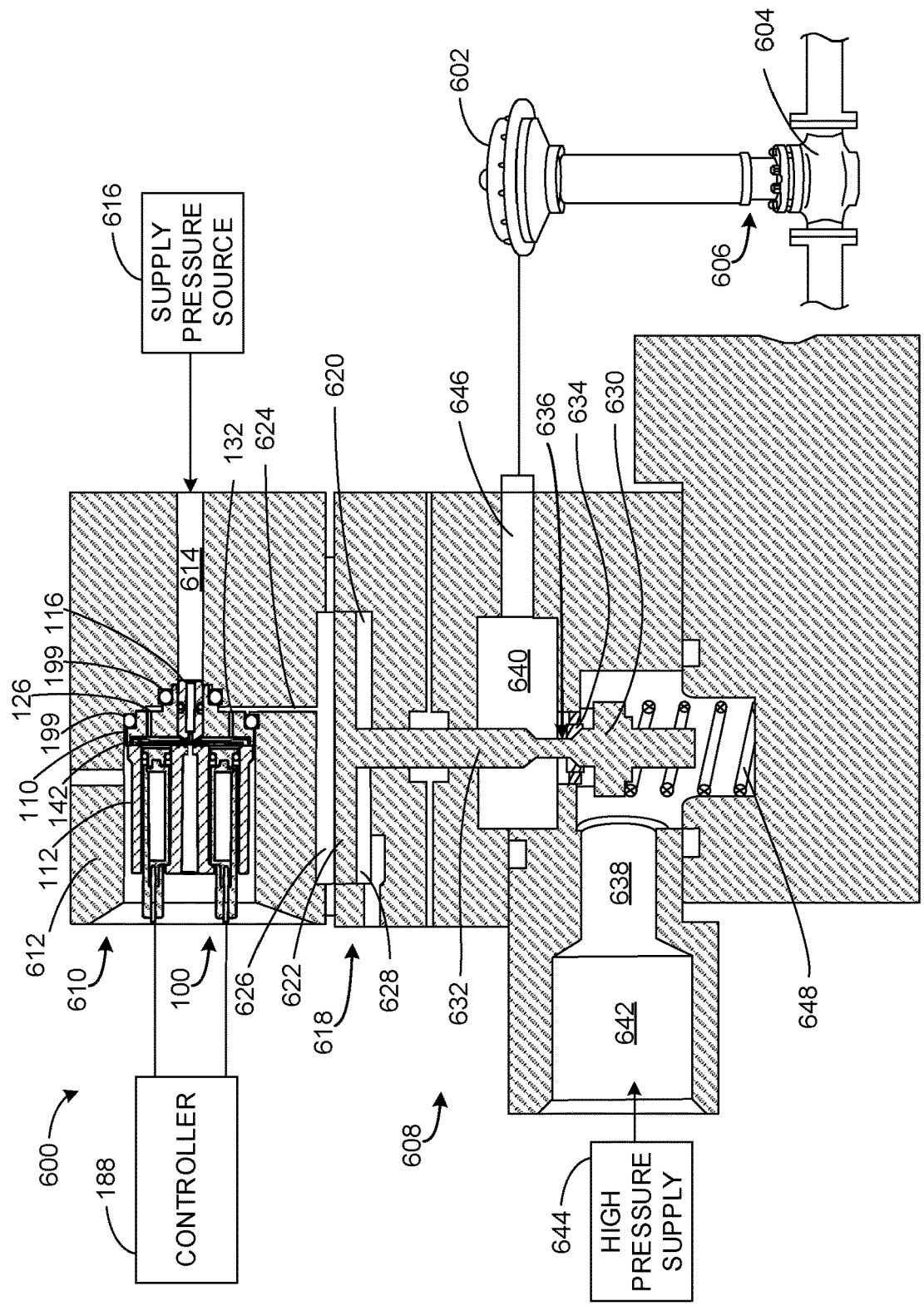
FIG. 6 is a cross-sectional view of an example valve controller implementing the example electro-pneumatic converter of FIGS. 1 and/or 2 to operate an example actuator.

FIG. 6 illustrates an example valve controller 600 (e.g., a positioner) in which the example converter 100 of FIGS. 1 and/or 2 is disposed. In other examples, the valve controller 600 is implemented using the example converter 400 of FIGS. 4 and/or 5. In the illustrated example, the valve controller 600 controls an actuator 602 for operating a valve 604 that is installed in a fluid process system 606 (e.g., a distribution piping system) of a processing system or plant. In the illustrated example, the valve controller 600 has been cross-sectioned and is not to scale with respect to the actuator 602 and the valve 604. The valve controller 600 supplies high pressure fluid to the actuator 602 to operate the valve 604 (e.g., by moving a valve stem). In the illustrated example, the valve controller 600 includes an amplifier or relay 608. The converter 100 produces a pneumatic output signal, which is amplified by the relay 608 and provided to the actuator 602 for operating the valve 604 (e.g., opening or closing the valve 604).

In the illustrated example of FIG. 6, the converter 100 is disposed within a bore 610 defined in a body 612 (e.g., a housing) of the valve controller 600. The seals 199 provide a fluid tight seal between the body 102 of the converter 100 and the body 612 of the valve controller 600. Further, the seals 199 define an annulus fluidly connecting the output ports 126, 132 to a passageway 624, discussed in further detail herein. In the illustrated example, the body 612 of the valve controller 600 includes a passageway 614 that fluidly couples a supply pressure source 616 (e.g., a low pressure source) to the supply port 115 of the converter 100. The converter 100 converts an electrical input signal into a pneumatic output signal by enabling the pressurized fluid to flow from the supply pressure source 616 through the converter 100 to the output ports 126, 132. The supply pressure source 616 may be, for example, plant air (e.g., compressed fluid, such as air or natural gas, distributed through a processing plant), pressurized fluid from the fluid process system 606, and/or pressurized fluid any other source of fluid. In some examples, the supply pressure source 616 is drawn from the high pressure supply 644 disclosed below and regulated to a relatively lower pressure.

In the illustrated example of FIG. 6, the output ports 126, 132 are fluidly coupled to an actuator 618 of the relay 608. The actuator 618 includes a chamber 620 and a piston 622 disposed in the chamber 620. The passageway 624 fluidly couples the output ports 126, 132 to a first side 626 of the chamber 620 on one side of the piston 622. A second side 628 of the chamber 620 is vented to atmosphere. When pressurized fluid is supplied to the first side 626 of the chamber 620, the piston 622 is moved downward in FIG. 6.

In the illustrated example of FIG. 6, the piston 622 is coupled to a plug 630 (e.g., a flow control member) via a stem 632. The plug 630 is movable toward and away from a seat 634. In the illustrated example, the seat 634 is disposed around an orifice 636 between a relay input chamber 638 and a relay output chamber 640. The relay input chamber 638 is fluidly coupled via a passageway 642 to a high pressure supply 644, and the relay output chamber 640 is fluidly coupled via a passageway 646 to the actuator 602. The high pressure supply 644 may be, for example, plant air (e.g., compressed fluid, such as air or natural gas, distributed through a processing plant), pressurized fluid from the fluid process system 606, and/or pressurized fluid from any other source of fluid source. The plug 630 is movable between a first position in which the plug 630 is engaged with the seat 634 and blocks the flow of pressurized fluid between the relay input chamber 638 and the relay output chamber 640 and a second position in which the plug 630 is moved away from the seat 634 and pressurized fluid can flow from the relay input chamber 638 to the relay output chamber 640 and, thus, to the actuator 602. The relay 608 includes a return spring 648 to bias the plug 630 to the first or closed position. In the illustrated example, the return spring 648 is disposed in the relay input chamber 638. However, in other examples, the return spring 648 may be disposed in other locations.

Described below is an example operation to supply high pressure fluid to the actuator 602 using the example valve controller 600. Although the example operation to supply the high pressure fluid to the actuator 602 using the valve controller 600 is described using the example converter 100 of FIGS. 1 and/or 2, it should be understood that the example converter 400 of FIGS. 4 and/or 5 can additionally or alternatively be used. First, the controller 188 receives a pressure command (e.g., from a control room) and activates the converter 100 by applying a current (e.g., an electrical input signal) to the solenoid 114. When activated, the solenoid 114 creates a magnetic field that attracts the armature 142, which moves the armature 142 away from the travel stop 116 (as illustrated in the position in FIG. 2). As a result, pressurized fluid from the supply pressure source 616 flows through the passageway 104 (FIG. 1) in the converter 100 between the supply port 115 and the output ports 126, 132. The pressurized fluid flows through the passageway 624 to the first side 626 of the chamber 620 of the actuator 618. The higher pressure in the first side 626 of the chamber 620 causes the piston 622 to move downward in FIG. 6. As a result, the plug 630 is moved away from the seat 634, which enables high pressure fluid to flow from the high pressure supply 644 to the actuator 602.

When the desired pressure is reached and/or the actuator 602 is to be stopped, the controller 188 deactivates the solenoid 114 by ceasing the application of current to the solenoid 114. As a result, the spring 140 (FIG. 1) moves back into engagement with the travel stop 116 (FIG. 1) or moves the armature 142 back into engagement with the travel stop 116, which blocks the flow of fluid through the passageway 104 (FIG. 1) between the supply port 115 and the output ports 126, 132, as illustrated in the position shown in FIG. 1. The passageway 104 (FIG. 1) fluidly couples the output ports 126, 132 to the first orifice 162 in the core 146 and, in turn, the exhaust port 166 (FIG. 1). Thus, the pressurized fluid in the passageway 624 (and the first side 626 of the chamber 620) is vented to atmosphere. As a result, the pressure in the first side 626 and the second side 628 of the chamber 620 stabilize, and the return spring 648 moves the plug 630 back into the first position in engagement with the seat 634, thereby blocking the flow of high pressure fluid to the actuator 602. Thus, the converter 100 converts a relatively small electrical input signal (e.g., 1-3 milliamperes) into a pneumatic output signal (at the output ports 126, 132), which is then amplified and used to control the actuator 602. The converter 100 can be turned on and off relatively quickly to provide small increments of pressurized fluid to the actuator 602, which enables relatively high precision of actuation.

In some examples, one converter and relay are used to supply high pressure fluid to the actuator 602 to operate the valve 604 in one direction (e.g., to open the valve 604), and a separate converter and relay are used to relieve the high pressure fluid from the actuator 602 to operate the valve 604 in the opposite direction (e.g., to close the valve 604). The relief converter and relay may be configured similar to the converter 100 and relay 608 in FIG. 6. However, the relay input chamber 638 is instead vented to atmosphere. As such, when the converter 100 opens the relay 608 (by moving the plug 630 away from the seat 634), the high pressure fluid in the relay output chamber 640 (from the actuator 602) is vented to the atmosphere, thereby relieving the pressure in the actuator 602 and enabling the valve 604 to be operated in the other direction. In some examples, the controller 188 controls both converters. In other examples, separate controllers may be implemented to control the respective converters.

While in the illustrated example of FIG. 6 the converter 100 and the relay 608 are integrated into the same body 612, in other examples the converter 100 and the relay 608 may be disposed in separate bodies and fluidly coupled via one or more conduits. In the illustrated example, the body 612 is constructed of multiple bodies or housings that are coupled together. In other examples, the body 612 may be a substantially unitary part or component.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that enable an electro-pneumatic converter to prevent or otherwise reduce wear on an armature. More specifically, the examples described herein reduce (e.g., substantially eliminate) friction that the armature encounters to enable the armature to maintain a sealing capability thereof. Accordingly, the examples disclosed herein have less bleed and a longer useful life than known electro-pneumatic converters.

Wear-resistant electro-pneumatic converters are disclosed herein. Further examples and combinations thereof include the following:

Example 1 includes an electro-pneumatic converter comprising a body including an axial passageway extending between a first opening and a second opening, the first opening associated with a supply port, the supply port to receive pressurized fluid from a pressure supply source, a solenoid disposed within the axial passageway, an armature including a first side and a second side opposite the first side, the second side facing the solenoid, the armature movable between a first position and a second position, the pressurized fluid blocked from flowing through an output port of the electro-pneumatic converter when the armature is in the first position, the pressurized fluid to flow through the output port when the armature is in the second position, and a spring coupled to the first side of the armature, the spring to bias the armature toward the first position.

Example 2 includes the electro-pneumatic converter of example 1, wherein the spring is disposed between the armature and the output port.

Example 3 includes the electro-pneumatic converter of example 1, wherein the spring is a sheet, the sheet including a first spiral cutout and a second spiral cutout, a portion of the first spiral cutout positioned within the second spiral cutout, a portion of the second spiral cutout positioned within the first spiral cutout.

Example 4 includes the electro-pneumatic converter of example 3, wherein the sheet includes a hole, the hole separate from the first and second spiral cutouts, the hole to enable the pressurized fluid to flow through the second opening when the armature is in the first position.

Example 5 includes the electro-pneumatic converter of example 4, wherein an edge of the hole extends off of an edge of the first spiral cutout.

Example 6 includes the electro-pneumatic converter of example 1, wherein an outer perimeter of the spring includes a notch, further including a tab extending from the notch, the tab extending away from a plane of the outer perimeter of the spring.

Example 7 includes the electro-pneumatic converter of example 6, wherein the tab includes a first end, a second end opposite the first end, and a pitch positioned between the first end and the second end, the pitch extending away from the plane of the outer perimeter of the spring, the first end of the tab fixed to the notch, a plane of the second end of the tab substantially parallel to the plane of the outer perimeter of the spring.

Example 8 includes the electro-pneumatic converter of example 1, wherein the armature includes openings to enable the pressurized fluid to flow between the second side of the armature and the solenoid when the armature is in the second position.

Example 9 includes the electro-pneumatic converter of example 1, further including a ring spacer positioned between an outer edge of the spring and the solenoid, the ring spacer to maintain a position of the spring.

Example 10 includes the electro-pneumatic converter of example 1, wherein the body includes a first portion and a second portion, the first portion of the body including the first opening, the second portion of the body including the second opening, an outer edge of the spring positioned between the first portion of the body and the second portion of the body.

Example 11 includes the electro-pneumatic converter of example 1, wherein the armature is to interface with a surface of the solenoid when the armature is in the second position, the solenoid including an exhaust port on the surface, the armature to sealing engage the surface of the solenoid around the exhaust port without an elastomeric element therebetween.

Example 12 includes an apparatus comprising a cap including a supply channel and an output channel, the supply channel to receive fluid from a supply source, a sleeve coupled to the cap, the cap and sleeve defining an axial passageway, a solenoid positioned in the sleeve, the solenoid spaced apart from the cap to define a chamber therebetween, the output channel in fluid communication with the supply channel via the chamber, an armature positioned in the chamber between the solenoid and the cap, and a spring positioned in the chamber between the armature and the cap, at least one of the spring or the armature to block the fluid from flowing through the output channel when the solenoid is not activated, the fluid to flow through the output channel in response to an activation of the solenoid.

Example 13 includes the apparatus of example 12, wherein the armature includes openings to place areas of the chamber on opposite sides of the armature in fluid communication.

Example 14 includes the apparatus of example 12, wherein an outer portion of the spring is to be sandwiched between an outer edge of the cap and an outer edge of the sleeve.

Example 15 includes the apparatus of example 12, further including a ring spacer to be positioned within the chamber, the ring spacer to maintain an outer portion of the spring against a surface of the cap.

Example 16 includes the apparatus of example 12, wherein the spring is a sheet, the sheet including a first spiral slot and a second spiral slot, the first spiral slot and the second spiral slot concentrically positioned in the sheet.

Example 17 includes the apparatus of example 16, wherein the first spiral slot follows an arced path that extends more than 180 degrees around a central portion of the spring.

Example 18 includes the apparatus of example 12, wherein a face of the armature and a face of the solenoid include a flatness of less than 10 micrometers.

Example 19 includes an electro-pneumatic converter comprising a supply port to receive pressurized fluid, an output port, an armature to move between a first position and a second position, the output port to be in fluid communication with the supply port when the armature is in the first position, the pressurized fluid blocked from accessing the output port when the armature is in the second position, means for biasing the armature toward the second position, the biasing means positioned between the armature and the supply port, and means for causing movement of the armature toward the first position.

Example 20 includes the electro-pneumatic converter of example 19, further including a cap, a housing, and means for retaining the biasing means against the cap, the retaining means positioned between the movement causing means and the biasing means.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An electro-pneumatic converter comprising:
a body including an axial passageway extending between a first opening and a second opening, the first opening associated with a supply port, the supply port to receive pressurized fluid from a pressure supply source;
a solenoid disposed within the axial passageway;
an armature including a first side and a second side opposite the first side, the second side facing the solenoid, the armature movable between a first position and a second position, the pressurized fluid blocked from flowing through an output port of the electro-pneumatic converter when the armature is in the first position, the pressurized fluid to flow through the output port when the armature is in the second position; and
a spring coupled to the first side of the armature, the spring to bias the armature toward the first position, wherein the spring is a sheet, the sheet including a first spiral cutout and a second spiral cutout, a portion of the first spiral cutout positioned within the second spiral cutout, a portion of the second spiral cutout positioned within the first spiral cutout.

2. The electro-pneumatic converter of claim 1, wherein the spring is disposed between the armature and the output port.

3. The electro-pneumatic converter of claim 1, wherein the sheet includes a hole, the hole separate from the first and second spiral cutouts, the hole to enable the pressurized fluid to flow through the second opening when the armature is in the first position.

4. The electro-pneumatic converter of claim 3, wherein an edge of the hole extends off of an edge of the first spiral cutout.

5. An electro-pneumatic converter comprising:
a body including an axial passageway extending between a first opening and a second opening, the first opening associated with a supply port, the supply port to receive pressurized fluid from a pressure supply source;
a solenoid disposed within the axial passageway;
an armature including a first side and a second side opposite the first side, the second side facing the solenoid, the armature movable between a first position and a second position, the pressurized fluid blocked from flowing through an output port of the electro-pneumatic converter when the armature is in the first position, the pressurized fluid to flow through the output port when the armature is in the second position; and
a spring coupled to the first side of the armature, the spring to bias the armature toward the first position, wherein an outer perimeter of the spring includes a notch, further including a tab extending from the notch, the tab extending away from a plane of the outer perimeter of the spring.

6. The electro-pneumatic converter of claim 5, wherein the tab includes a first end, a second end opposite the first end, and a pitch positioned between the first end and the second end, the pitch extending away from the plane of the outer perimeter of the spring, the first end of the tab fixed to the notch, a plane of the second end of the tab substantially parallel to the plane of the outer perimeter of the spring.

7. An electro-pneumatic converter comprising:
a body including an axial passageway extending between a first opening and a second opening, the first opening associated with a supply port, the supply port to receive pressurized fluid from a pressure supply source;
a solenoid disposed within the axial passageway;
an armature including a first side and a second side opposite the first side, the second side facing the solenoid, the armature movable between a first position and a second position, the pressurized fluid blocked from flowing through an output port of the electro-pneumatic converter when the armature is in the first position, the pressurized fluid to flow through the output port when the armature is in the second position, wherein the armature includes openings to enable the pressurized fluid to flow between the second side of the armature and the solenoid when the armature is in the second position; and
a spring coupled to the first side of the armature, the spring to bias the armature toward the first position.

8. The electro-pneumatic converter of claim 7, further including a ring spacer positioned between an outer edge of the spring and the solenoid, the ring spacer to maintain a position of the spring.

9. The electro-pneumatic converter of claim 7, wherein the body includes a first portion and a second portion, the first portion of the body including the first opening, the second portion of the body including the second opening, an outer edge of the spring positioned between the first portion of the body and the second portion of the body.

10. The electro-pneumatic converter of claim 7, wherein the armature is to interface with a surface of the solenoid when the armature is in the second position, the solenoid including an exhaust port on the surface, the armature to sealing engage the surface of the solenoid around the exhaust port without an elastomeric element therebetween.

11. The electro-pneumatic converter of claim 7, wherein the spring is disposed between the armature and the output port.

12. The electro-pneumatic converter of claim 7, wherein an outer perimeter of the spring includes a notch, further including a tab extending from the notch, the tab extending away from a plane of the outer perimeter of the spring.

13. An apparatus comprising:
a cap including a supply channel and an output channel, the supply channel to receive fluid from a supply source;
a sleeve coupled to the cap, the cap and sleeve defining an axial passageway;
a solenoid positioned in the sleeve, the solenoid spaced apart from the cap to define a chamber therebetween, the output channel in fluid communication with the supply channel via the chamber;
an armature positioned in the chamber between the solenoid and the cap, wherein the armature includes openings to place areas of the chamber on opposite sides of the armature in fluid communication; and
a spring positioned in the chamber between the armature and the cap, at least one of the spring or the armature to block the fluid from flowing through the output channel when the solenoid is not activated, the fluid to flow through the output channel in response to an activation of the solenoid.

14. The apparatus of claim 13, wherein an outer portion of the spring is to be sandwiched between an outer edge of the cap and an outer edge of the sleeve.

15. The apparatus of claim 13, further including a ring spacer to be positioned within the chamber, the ring spacer to maintain an outer portion of the spring against a surface of the cap.

16. The apparatus of claim 13, wherein the spring is a sheet, the sheet including a first spiral slot and a second spiral slot, the first spiral slot and the second spiral slot concentrically positioned in the sheet.

17. An apparatus comprising:
a cap including a supply channel and an output channel, the supply channel to receive fluid from a supply source;
a sleeve coupled to the cap, the cap and sleeve defining an axial passageway;
a solenoid positioned in the sleeve, the solenoid spaced apart from the cap to define a chamber therebetween, the output channel in fluid communication with the supply channel via the chamber;
an armature positioned in the chamber between the solenoid and the cap; and
a spring positioned in the chamber between the armature and the cap, at least one of the spring or the armature to block the fluid from flowing through the output channel when the solenoid is not activated, the fluid to flow through the output channel in response to an activation of the solenoid, wherein the spring is a sheet, the sheet including a first spiral slot and a second spiral slot, the first spiral slot and the second spiral slot concentrically positioned in the sheet, wherein the first spiral slot follows an arced path that extends more than 180 degrees around a central portion of the spring.

18. An apparatus comprising:
a cap including a supply channel and an output channel, the supply channel to receive fluid from a supply source;
a sleeve coupled to the cap, the cap and sleeve defining an axial passageway;
a solenoid positioned in the sleeve, the solenoid spaced apart from the cap to define a chamber therebetween, the output channel in fluid communication with the supply channel via the chamber;
an armature positioned in the chamber between the solenoid and the cap, wherein a face of the armature and a face of the solenoid include a flatness of less than 10 micrometers; and
a spring positioned in the chamber between the armature and the cap, at least one of the spring or the armature to block the fluid from flowing through the output channel when the solenoid is not activated, the fluid to flow through the output channel in response to an activation of the solenoid.

19. An electro-pneumatic converter comprising:
a supply port to receive pressurized fluid;
an output port;
an armature to move between a first position and a second position, the output port to be in fluid communication with the supply port when the armature is in the first position, the pressurized fluid blocked from accessing the output port when the armature is in the second position;
means for biasing the armature toward the second position, the biasing means positioned between the armature and the supply port; and
means for causing movement of the armature toward the first position, the armature including openings to enable the pressurized fluid to flow between the armature and the movement causing means when the armature is in the second position.

20. The electro-pneumatic converter of claim 19, further including:
a cap;
a housing; and
means for retaining the biasing means against the cap, the retaining means positioned between the movement causing means and the biasing means.

\* \* \* \* \*